March 6, 1956 R. E. SEITER 2,736,963
CUTTING TOOL HAVING DISPOSABLE CUTTING SEGMENTS
Filed Sept. 29, 1953 2 Sheets-Sheet 1
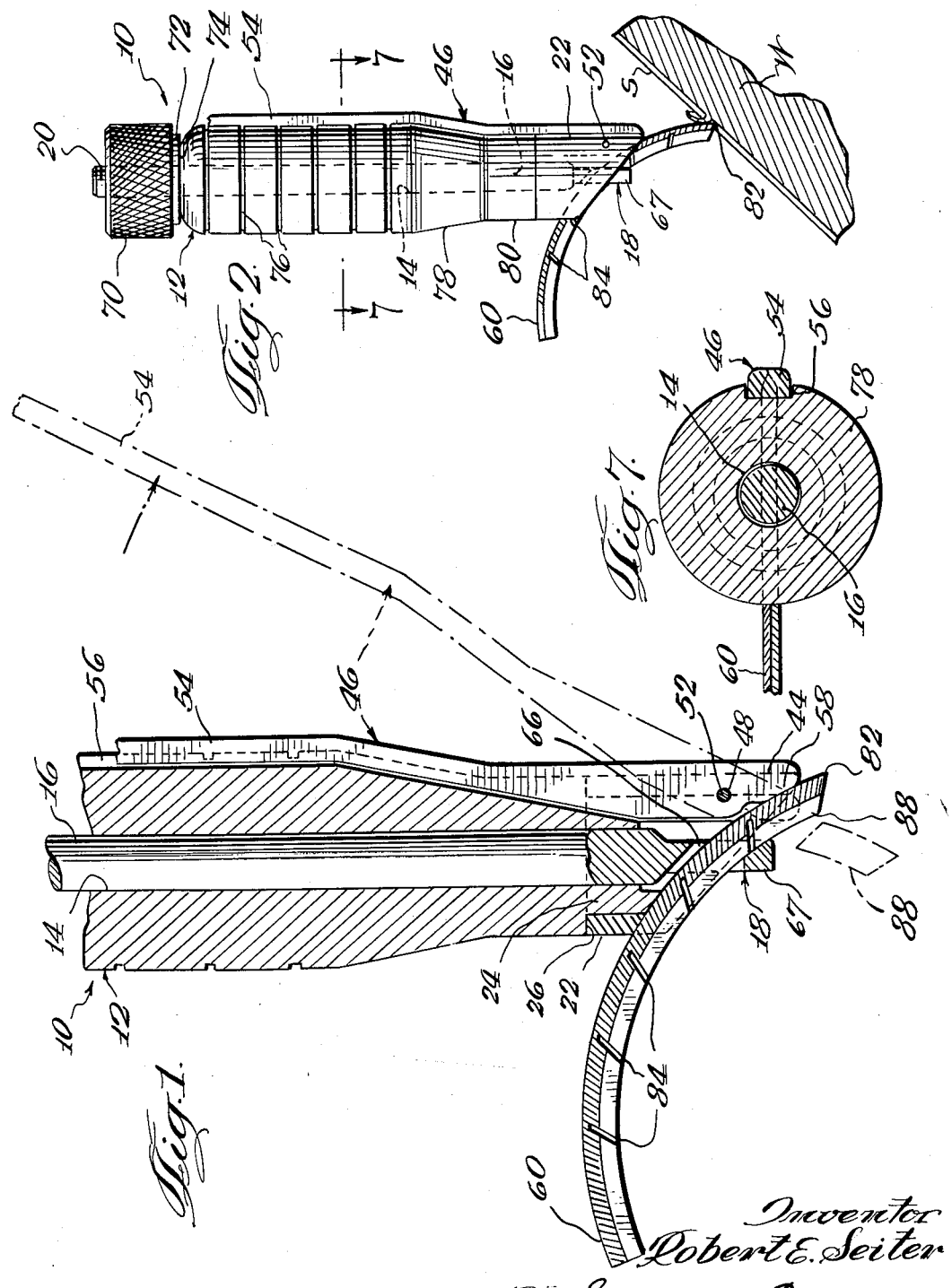
Inventor
Robert E. Seiter
By Silverman & Mullin
Attorneys March 6, 1956  R. E. SEITER  2,736,963
CUTTING TOOL HAVING DISPOSABLE CUTTING SEGMENTS
Filed Sept. 29, 1953  2 Sheets-Sheet 2
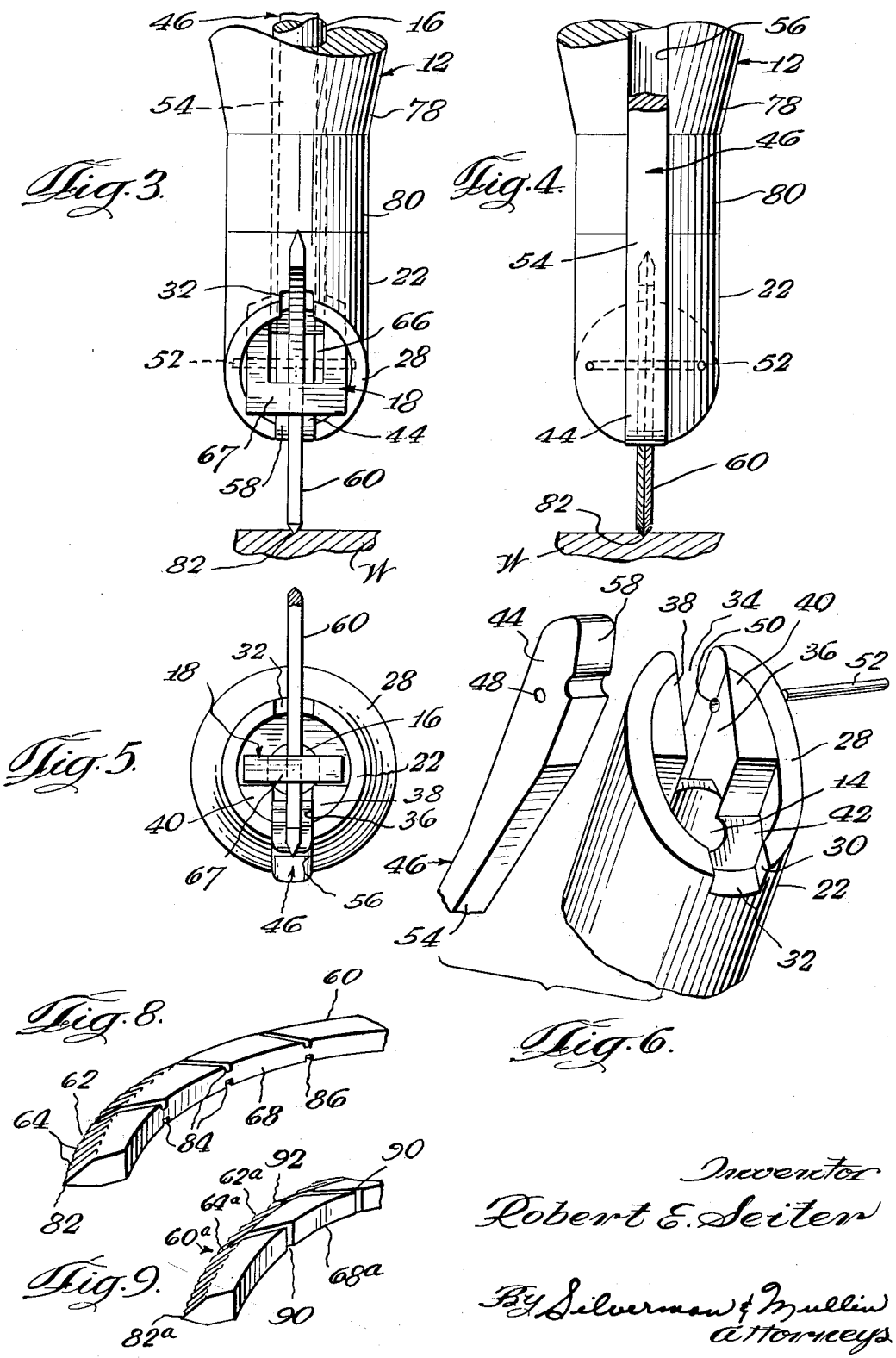
Inventor
Robert E. Seiter
By Silverman & Mullin
Attorneys

United States Patent Office 2,736,963
Patented Mar. 6, 1956

2,736,963

CUTTING TOOL HAVING DISPOSABLE CUTTING SEGMENTS

Robert E. Seiter, Homewood, Ill.

Application September 29, 1953, Serial No. 382,910

7 Claims. (Cl. 30—334)

This invention relates to improvements in cutting tools such as may be used for engraving, in dental work, or for checkering or hand knurling the surfaces of wooden articles such as gun stocks and the like. More particularly, the invention relates to improvements wherein worn-out dulled cutting edges may be continuously replaced by fresh, sharp cutting edges without necessitating the removal of the cutting blade from the tool support or handle.

It is well known that various tools such as engraving tools, dental instruments, checkering devices and the like utilize cutting blades supported within spindles or handles. As the cutting blades become dulled through usage, they must either be dismantled and the cutting blade replaced, in those tools which permit replacement of the cutting blade, or the entire tool must be discarded and replaced by one in which the tool has been sharpened and heat-treated anew. Obviously, such a practice is time-consuming and expensive and hence most undesirable. It is therefore an important object of this invention to provide a tool of the character described which will overcome the undesirable properties mentioned hereinabove.

Another important object is to afford a checkering tool or the like having a cutting blade divided into a plurality of consecutively positioned cutting edges, said blade so constructed that as the working cutting edge becomes dulled, it may readily be replaced by a fresh, sharp cutting edge, without necessitating the dismantling of the tool. An object relating thereto is to provide means integrally associated with the tool handle for removing the dulled cutting edge thereby exposing a new, sharp cutting edge segment.

A further object is to afford a cutting tool, such as a checkering tool, wherein the cutting edge of the blade is fully exposed presenting an unobstructed view thereof to the eye of the craftsman.

Yet another object is to provide a cutting tool in which the entire cutting blade may be removed and replaced by a simple operation requiring no auxiliary tools or devices.

Yet a further object is to afford a tool in which the angular disposition of the cutting edge with respect to the work may be readily changed as desired, thereby eliminating the necessity for exchanging the entire tool for one having a different angular cutting edge.

Still another object is to provide a cutting tool which is easily and conveniently operable.

Still a further object is to afford a cutting tool of simple, inexpensive construction yet sturdy, durable and most effective.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is an enlarged sectional view taken longitudinally through the tool and showing in dot-dash outline the operable position of the blade changing mechanism;

Fig. 2 is a side elevational view showing the tool in operational position on the surface of a piece of work;

Fig. 3 is an enlarged front elevational view of a portion of the tool showing the same in operational position on a piece of work;

Fig. 4 is a view similar to Fig. 3 but with the tool viewed from the rear;

Fig. 5 is a plan view illustrating the cutting end of the tool;

Fig. 6 is an enlarged fragmentary exploded view showing in perspective certain constructional details of the tool;

Fig. 7 is a cross-sectional view taken on the plane of line 7—7 in Fig. 2 of the drawings;

Fig. 8 is a fragmentary perspective view of my novel cutting blade; and

Fig. 9 is a similar view showing another embodiment of the cutting blade.

Referring now to the several figures of the drawings, reference numeral 10 indicates generally a cutting tool which, in the embodiment chosen for illustration, comprises a checkering tool. The tool 10 is formed by assembling together a number of parts including a cylindrically shaped handle 12 which may be formed from any suitable material such as wood, plastic, hard rubber, and the like. The handle 12 is formed with a longitudinal central bore 14 therethrough within which may be positioned in removable relationship a bolt 16.

The bolt 16 is formed with a rectangular shaped stirrup 18 at one end and at the other end is screw-threaded as at 20. The stirrup 18 is adapted to at least partially protrude above the open end of a ferrule 22. The ferrule 22 is adapted to fit over the upper portion of the handle 12 which is undercut as at 24 to provide a shoulder 26 against which the bottom of the ferrule 22 may abut. The top surfaces 28 of the ferrule 22 are inclined as shown in Figs. 1 and 6 of the drawings. A groove or slot 30 is formed centrally at the bottom of the inclined surface 28 in the ferrule 22. The bottom 32 of the slot 30 is likewise inclined in the same plane as the top surfaces 28 of the ferrule. The ferrule 22 is further formed with a longitudinal gap 34 extending through the entire height of the ferrule at a position diametrically opposed to the slot 30 and hence positioned in the portion of the ferrule of greatest dimension. The function of this gap 34 will be disclosed as the description proceeds.

The undercut portion 24 of the handle 12 is further cut out at the top thereof as shown in Fig. 6 of the drawings to provide an open gap or slot 36 positioned in alignment with the ferrule gap 34. Thus the handle gap 36 is defined by a pair of legs such as 38 and 40. The front portion of the undercut handle portion 24 is further cut out to afford a seat 42 which registers with the highest and innermost portion of the inclined ferrule slot bottom 32.

The ferrule gap 34 is provided for the purpose of accommodating therein the head portion 44 of a lever 46. The lever-head 44 may be formed with a passageway 48 therethrough adapted to register with similar openings such as 50 formed through the portions of the ferrule 22 adjacent the gap 34. Through these aligned openings 50 and 48 may be inserted a pivot pin 52 whereby the lever 46 may be pivotally mounted within the ferrule gap 34.

The lever 46 may be formed with a long handle 54 extending along the entire length of the tool handle 12. To accommodate the lever handle 54, a complementary longitudinal slot 56 may be formed in the tool handle 12 whereby the lever handle may be substantially embedded within the tool handle when the lever is not in use. Thus, the tool handle may be conveniently and comfortably grasped by the operator; the protruding outer portion of the lever handle being such that it does not interfere with the use of the tool.

The head 44 of the lever 46 may be formed with an inclined surface 58, the plane of which is in register with the planes of the ferrule's inclined top surface 28. The function of the inclined top surfaces of the tool will become evident with the description of the manner in which a cutting blade such as 60 is mounted in the tool. This will now be described in some detail.

Accordingly, attention is now directed to Figs. 1, 2, and 3 of the drawings wherein it will be noted that the cutting blade 60 comprises a relatively thin arcuate shaped piece of tool steel hardened as by heat treatment and shaped to afford a knife-like cutting edge 62 with a plurality of spaced cutting teeth 64.

The blade 60 may be mounted within the tool 10 by inserting the same through the stirrup 18 so that the same is positioned through the stirrup opening 66 with a portion abutting the inclined lever-head surface 58 and another portion of the blade abutting the inclined bottom surface 32 of the slot 30. The knife blade may be forced into abutment with the aforementioned surfaces by the top wall 67 of the stirrup 18 which in turn is brought to bear against the concave surface 68 of the blade in a manner which will now be described in detail.

It was previously stated that the bottom end of the bolt 16 was screw-threaded as at 20. This portion of the bolt protrudes from the bottom of the handle 12 so that a fastening and tightening device such as a knurled nut 70 may be threaded thereon adjacent a washer such as 72. Thus when the nut 70 is tightened, it bears against the washer 72 forcing the same against the bottom 74 of the handle 12. This then draws the bolt 16 with the integrally formed stirrup down until the bottom of the top wall 67 of the stirrup 18 bears against the concave surface 68 of the blade 60. This in turn forces the edge 62 of the blade down until the same abuts the inclined surfaces of the lever-head 58 and slot 32 thereby securing the blade in substantially immovable relationship within the tool.

The handle of the tool 12 may be formed in any shape most convenient for grasping by the hand of the operator. In the embodiment chosen for illustration it will be noted that the shank of the handle is formed with spaced grooves such as 76 to afford a friction surface by which the tool may be more readily grasped. The leading portion of the tool handle 12 may be formed with an inclined surface portion 78 adjacent a vertical surface portion 80, the diameter of which is the same as that of the ferrule 22. This shape provides a comfortable finger-grasping portion adapted to accommodate the thumb and fingers of the hand.

It will be readily perceived from the above description that the blade 60 may be readily removed entirely from the tool by merely loosening the nut 70. By the same operation the position of the blade 60 within the stirrup 18 may be readily changed. Thus, the cutting tip 82 may be positioned at any desired distance from the stirrup 18.

The aforementioned characteristic of the tool suggests a unique and highly desirable method of renewing the cutting edge of the blade within the tool, as the edge becomes worn through usage, in a novel manner requiring a minimum of effort and dismantling of the tool. Accordingly it will be noted in Figs. 1, 2, and 8 of the drawings that the blade 60 is formed with a plurality of grooves such as 84 cut inwardly from the sides of the blade 60 as shown in Fig. 8 of the drawings leaving a thin central bridge 86 comprising a weakened area in the blade. Thus when the cutting tip 82 becomes dull, the segment of the blade in which the cutting tip 82 is positioned may be merely broken off thereby exposing a fresh, sharp cutting tip.

To accomplish this, the lever 46 is utilized as shown in Fig. 1 of the drawing. The lever handle 54 may be grasped in the fingers of the operator and the lever pivoted about its pivot 52 so that the lever-head 44, especially the inclined surface 58, bears down on the adjacent leg segments such as 88 until the same is broken off. This exposes a fresh cutting tip 82. It also will be noted that the slots 84 are formed in an inclined plane so that the same inclined cutting tip is presented in each of the segments. After the used blade segment 88 has been broken off the lever handle 54 is then pivoted back until it is once more positioned within the groove 56. However it should be noted that the bridge 86 is of sufficient thickness to prevent ready breaking during operational use of the tool. In this embodiment it should further be noted that the grooves 84 may serve as escape outlets for the sawdust resulting from the checkering operation.

In Fig. 9 of the drawings a modification of the cutting blade 60 is illustrated. Similar parts are designated by like numerals with the added suffix "a."

In this embodiment slots such as 90 are formed extending inwardly from the concave surface 58 across the entire width of the blade. These slots 90 are of a depth leaving a thin, unslotted cutting edge portion 92 which serves as a weakened area much as does the bridge 86 in the previously described embodiment. Thus the lever 46 is adapted to break through this weakened area 92 to expose a fresh cutting edge 82a in the same manner as previously described.

In operation the tool handle is grasped in the hand of the artisan so that the cutting tip 82a bears against the workpiece W, the surface of which is desired to be checkered. The tool may be positioned in a plane inclined to the work surface S. Thus by drawing the cutting tip 82a across the surface, the cutting teeth 64a penetrate the surface and form a checkering line. This operation is repeated to form successive lines in the predetermined pattern until a complete pattern has been cut into the surface. As the work progresses and the cutting tool edge 64a becomes dull, it becomes necessary to expose a new sharper cutting edge 82a. To accomplish this the operator pivots the handle 54 of the lever 46 in the manner previously described and illustrated in Fig. 1 of the drawings, thereby breaking off the dulled cutting edge segments 88 and exposing the fresh new segment. The knurled nut 70 may then be loosened thereby loosening the stirrup 18 so that the knife blade 60 may be pushed up until the cutting tip 82 is positioned as desired in relation to the head of the tool. The work is then continued and the replacement operation repeated whenever necessary.

From the above description it should be evident that I have provided a cutting tool such as may be used in checkering, engraving, or any other craft in which a cutting blade is used. The tool is characterized by the means which is incorporated therein for changing the position of the cutting blade with respect to the spindle or handle of the tool and with further means for readily removing a used blade segment in such a manner that at the same time a fresh blade segment is exposed. This eliminates the necessity of either changing tools or replacing the cutting blade as by dismantling—partially or wholly—the tool itself. I have further provided a novel cutting tool blade divided into successive segments each of which has a new sharp cutting edge which may be exposed and moved to operational position simultaneously with the ready removal of the preceding cutting edge after the latter has become dulled through usage.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. A checkering tool comprising in combination a handle with a longitudinal bore formed therethrough, a ferrule mounted on an undercut end of said handle, said ferrule formed with inclined outer end surfaces and a slot in the ferrule wall at the lower end of said inclined end surface, said ferrule further formed with a gap positioned in the wall diametrically opposed to said slot, a bolt removably positioned in said longitudinal handle bore, a stirrup integrally formed at the upper end of said bolt, a tightening nut threaded on the lower end of said bolt below the bottom of said handle, a lever having a head and a handle pivotally mounted with said head positioned in said ferrule gap, and an arcuate shaped cutting blade mounted in said stirrup with portions thereof positioned in said slot and other portions bearing against said lever-head, said cutting blade divided into a plurality of readily separable segments, said lever movable to force said head against one segment of said blade whereby said segment is broken off to expose a new cutting edge of said blade.

2. In a checkering tool of the character described, a cutting blade comprising a curved piece of tool steel with the convex side tapered to afford a knife edge having a plurality of cutting teeth, a plurality of grooves obliquely formed in spaced relationship one with the other affording cutting segments separated by weakened areas, said blade readily breakable within said weakened areas for disposing of dulled cutting segments and exposing new sharp segments.

3. The checkering tool of claim 2 in which said grooves are formed in aligned pairs opening to the sides of said blade.

4. The checkering tool of claim 2 in which said grooves extend across the full width of the blade opening to the concave side of the blade opposite the knife edge.

5. In a checkering tool comprising a handle having blade clamping means removably positioned at one end thereof and adjusting means positioned at the other end, said adjusting means operationally connected to said blade clamping means; a cutting blade comprising a curved piece of tool steel with the convex side tapered to afford a knife edge having a plurality of cutting teeth, a plurality of grooves obliquely formed in spaced relationship one with the other affording cutting segments separated by weakened areas, said blade being readily breakable within said weakened areas for disposing of dulled cutting segments and exposing new sharp segments, said blade clamped against said first-mentioned handle end by said clamping means.

6. The checkering tool of claim 5 in which said grooves are formed in aligned pairs opening to the sides of said blade.

7. The checkering tool of claim 5 in which said grooves extend across the full width of the blade opening to the concave side of the blade opposite the knife edge.

References Cited in the file of this patent

UNITED STATES PATENTS

| Number | Name | Date |
|---|---|---|
| 42,537 | Richard | Apr. 26, 1864 |
| 1,493,372 | Moon | May 6, 1924 |
| 1,684,830 | Heffelbower | Sept. 18, 1928 |
| 1,751,476 | Goetzke | Mar. 25, 1930 |
| 1,813,699 | Goetzke | July 7, 1931 |
| 1,985,537 | Egan | Dec. 25, 1934 |
| 2,048,322 | Cathey | July 21, 1936 |
| 2,051,199 | Christianson | Aug. 18, 1936 |
| 2,307,411 | Leatherman | Jan. 5, 1943 |
| 2,612,687 | Burch | Oct. 7, 1952 |